(12) United States Patent
Yeo

(10) Patent No.: US 8,673,482 B2
(45) Date of Patent: Mar. 18, 2014

(54) SECONDARY BATTERY INCLUDING AN EXTENSION WALL

(75) Inventor: Kwangsoo Yeo, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 594 days.

(21) Appl. No.: 12/704,401

(22) Filed: Feb. 11, 2010

(65) Prior Publication Data

US 2010/0323224 A1    Dec. 23, 2010

Related U.S. Application Data

(60) Provisional application No. 61/218,353, filed on Jun. 18, 2009.

(51) Int. Cl.
 *H01M 2/00* (2006.01)

(52) U.S. Cl.
 USPC ........... 429/163; 429/175; 429/174; 429/185; 429/7

(58) Field of Classification Search
 USPC ......... 429/163, 174, 175, 177, 185, 186, 176, 429/7
 See application file for complete search history.

(56) References Cited

U.S. PATENT DOCUMENTS

| | | | |
|---|---|---|---|
| 2003/0157404 A1 | 8/2003 | Inoue et al. | |
| 2006/0269836 A1* | 11/2006 | Yamamoto et al. | 429/159 |
| 2008/0160398 A1* | 7/2008 | Kim | 429/121 |

FOREIGN PATENT DOCUMENTS

| | | |
|---|---|---|
| JP | 2005-346964 | 12/2005 |
| JP | 2006-147193 | 6/2006 |
| JP | 2006-331975 | 12/2006 |
| JP | 2009-087554 | 4/2009 |
| KR | 10-2005-0080513 | 8/2005 |
| KR | 10-2005-0080516 | 8/2005 |
| KR | 10-2005-0080516 A | 8/2005 |
| KR | 10-0748109 B1 | 8/2007 |
| KR | 10-0839783 B1 | 6/2008 |
| WO | WO 2006/073960 A2 | 7/2006 |

OTHER PUBLICATIONS

European Search Report dated Jun. 29, 2010, for corresponding European Patent application 10154642.2, noting listed references in this IDS.
KIPO Office action dated Mar. 28, 2012, for corresponding Korean Patent application 10-2010-0047958, 4 pages.
Espacenet English Abstract, and English machine translation of Japanese Publication 2006-331975, listed above, 11 pages, also corresponds to U.S. Publication 2006/0269836.
Japanese Office action dated Oct. 9, 2012, for corresponding Japanese Patent application 2010-134064, (1 page).
Patent Abstracts of Japan, and English machine translation of Japanese Publication 2005-346964 listed above, (11 pages).

(Continued)

*Primary Examiner* — Raymond Alejandro

(74) *Attorney, Agent, or Firm* — Christie, Parker & Hale, LLP

(57) ABSTRACT

A secondary battery includes an electrode assembly; a can containing the electrode assembly and including a plate, a wall extending from the plate in a first direction to a first end and defining a first cavity having a first opening opposite the plate, and a first extension wall extending from the first end in the first direction to a second end, the first extension wall defining a second cavity having a second opening opposite the plate; and a cap assembly including a cap plate and sealing the first cavity at the first opening.

17 Claims, 5 Drawing Sheets

(56) References Cited

OTHER PUBLICATIONS

Patent Abstracts of Japan, and English machine translation of Japanese Publication 2006-147193 listed above, (18 pages).

Patent Abstracts of Japan, and English machine translation of Japanese Publication 2009-087554 listed above, (15 pages).

* cited by examiner

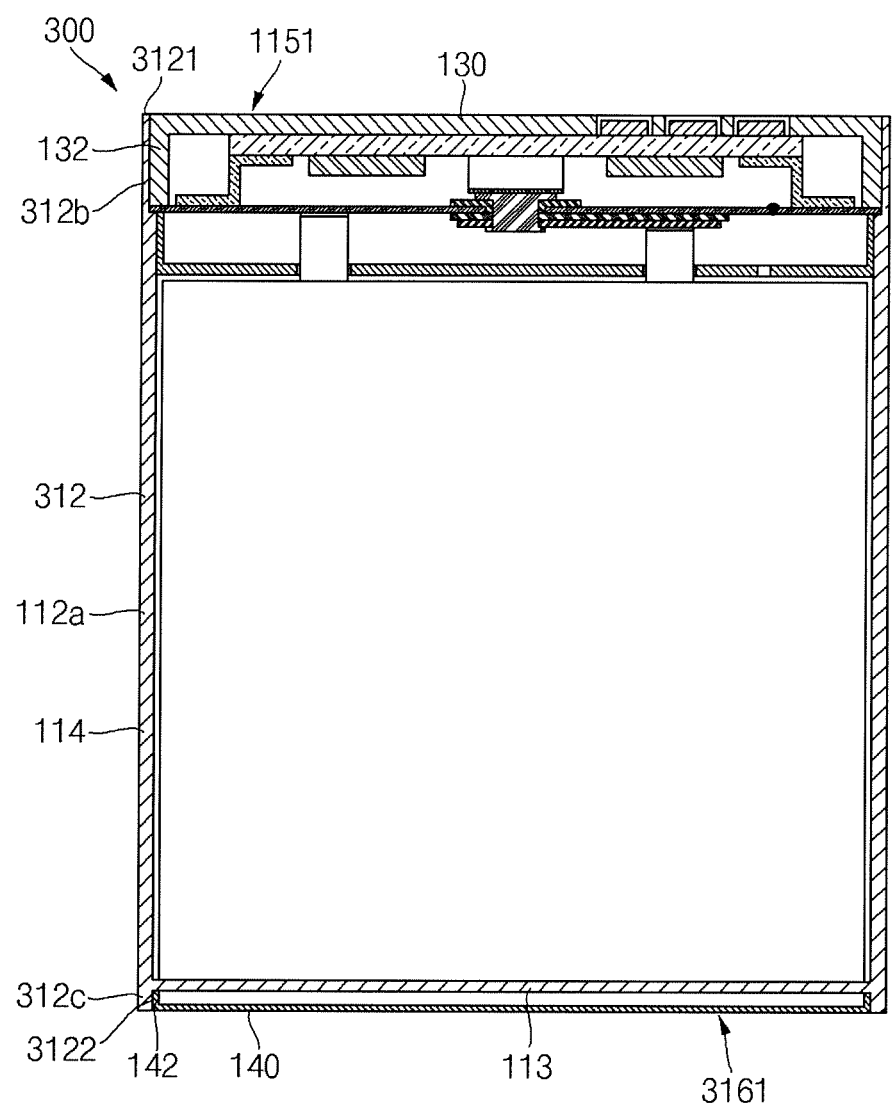

SECONDARY BATTERY INCLUDING AN EXTENSION WALL

CROSS-REFERENCE TO RELATED APPLICATION

This application claims priority to and the benefit of U.S. Provisional Patent Application No. 61/218,353 filed on Jun. 18, 2009, the entire content of which is incorporated herein by reference.

BACKGROUND

1. Field

Aspects of embodiments of the present invention relate to a secondary battery.

2. Description of the Related Art

In recent years, due to rapid development of electronics, portable electronic devices are being widely distributed. Rechargeable secondary batteries are being used mainly as power sources of portable electronic devices.

Today, a pack type battery is widely used as a secondary battery. The pack type battery is configured by a single unit into which a bare cell supplying electric energy and a protection circuit module (PCM) stably controlling charge and discharge are integrated.

SUMMARY

Aspects of embodiments of the present invention provide a secondary battery in which elements are assembled compactly and stably.

A secondary battery according to one embodiment of the present invention includes an electrode assembly; a can containing the electrode assembly and including a plate, a wall extending from the plate in a first direction to a first end and defining a first cavity having a first opening opposite the plate, and a first extension wall extending from the first end in the first direction to a second end, the first extension wall defining a second cavity having a second opening opposite the plate; and a cap assembly including a cap plate and sealing the first cavity at the first opening.

In one embodiment, the plate and the wall are integrally formed. In one embodiment, the wall and the first extension wall are integrally formed.

In one embodiment, the cap plate is attached to the can in the second cavity and electrically coupled to an electrode tab of the electrode assembly. A secondary battery may further include an insulating case in the first cavity, the insulating case located between the electrode assembly and the cap plate for electrically insulating the electrode assembly from the cap plate.

In one embodiment, a secondary battery further includes a protection circuit module in the second cavity, the protection circuit module supported by the cap plate and adapted to control charging and discharging of the secondary battery. A secondary battery may further include a first cover case in the second cavity between the protection circuit module and the second opening. The can may further include a first crimping portion proximate the second end, the first crimping portion fixing the first cover case to the can. The first extension wall and the first crimping portion may be integrally formed.

In one embodiment, the first extension wall includes a protrusion protruding inward, and the first cover case has a groove on an outer surface thereof, the groove receiving the protrusion and coupling the first cover case to the can. The first cover case may be press-fit into the can at the second end.

In one embodiment, the first extension wall has a thickness less than a thickness of the wall such that a step is formed at the first end of the wall. In one embodiment, the cap plate is attached to the can on the step. The cap plate may be welded to the can.

In one embodiment, the cap plate has a perimeter size and shape substantially corresponding to a size and shape of the second opening.

In one embodiment, the can further includes a second extension wall extending from the plate in a second direction opposite the first direction to a third end, the second extension wall defining a third cavity having a third opening. A secondary battery may further include a second cover case in the third cavity between the plate and the third opening. In one embodiment, the can further includes a second crimping portion proximate the third end, the second crimping portion fixing the second cover case to the can. The second extension wall and the second crimping portion may be integrally formed.

A secondary battery according to another embodiment of the present invention includes an electrode assembly; a can containing the electrode assembly and including a plate, a wall extending from the plate in a first direction to a first end and defining a first cavity having a first opening opposite the plate, and an extension wall extending from the first end in the first direction to a second end, the extension wall defining a second cavity having a second opening opposite the plate; a cap assembly including a cap plate and sealing the first cavity at the first opening; an insulating case in the first cavity, the insulating case located between the electrode assembly and the cap plate for electrically insulating the electrode assembly from the cap plate; a protection circuit module in the second cavity, the protection circuit module supported by the cap plate and adapted to control charging and discharging of the secondary battery; and a cover case in the second cavity between the protection circuit module and the second opening.

According to aspects of another embodiment of the present invention, a secondary battery includes: an electrode assembly; a can having a bottom plate and a body formed by side walls extending from the bottom plate; a cap plate closing an opening of the body; a protection circuit module coupled on the cap plate; and a top case covering the protection circuit module, wherein the can further includes a first extension wall extending far from an end of a side wall of the body in a direction away from the bottom plate. The protection circuit module and the top case may be accommodated in the can, and the top case may be coupled with the can by crimping, press-fitting, or coupling through grooves so that the elements of the secondary battery may be compactly and stably coupled to one another.

BRIEF DESCRIPTION OF THE DRAWINGS

These and/or other features and aspects of the present invention will become apparent and more readily appreciated from the following description of some exemplary embodiments, taken in conjunction with the accompanying drawings of which:

FIG. 5 is a sectional view illustrating the secondary battery according to another embodiment of the present invention.

DETAILED DESCRIPTION

Hereinafter, a secondary battery according to embodiments of the present invention will be described in detail with reference to the accompanying drawings.

First, a secondary battery according to an embodiment of the present invention will be described with reference to FIGS. 1 to 3.

Figure 1:
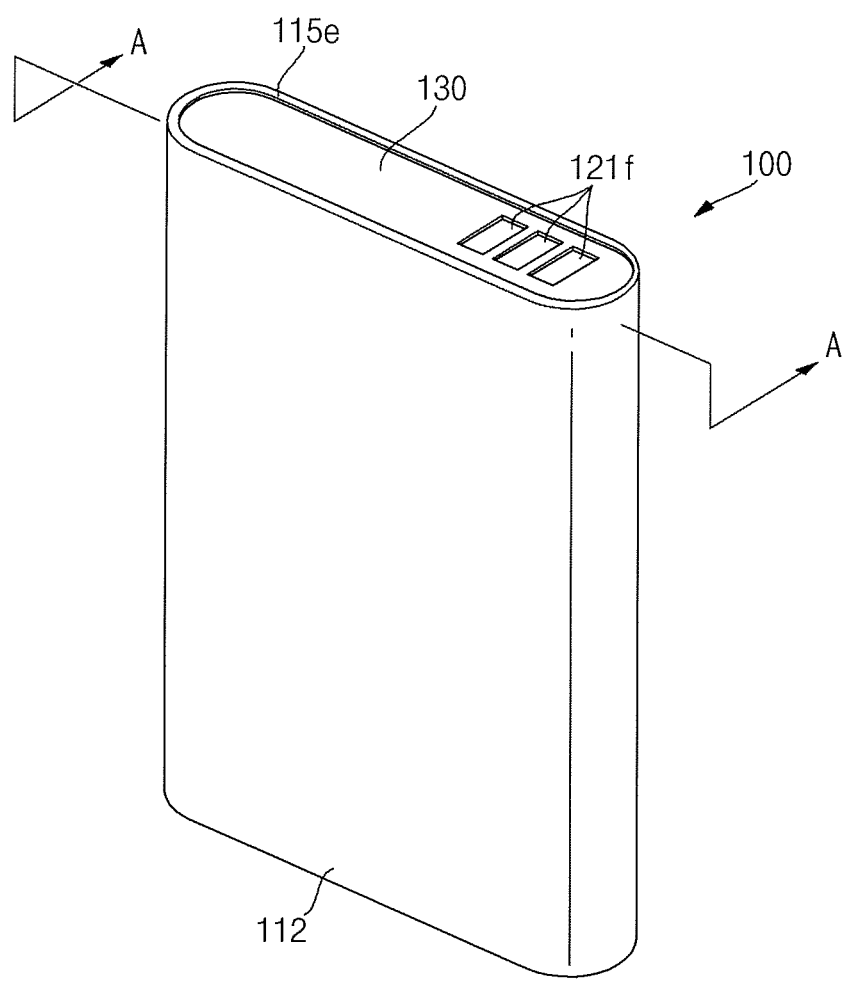
FIG. 1 is a perspective view illustrating a secondary battery according to an embodiment of the present invention.

FIG. 1 is a perspective view illustrating a secondary battery according to an embodiment of the present invention. FIG. 2 is an exploded perspective view illustrating the secondary battery of FIG. 1. FIG. 3 is a sectional view of the secondary battery of FIG. 1, taken along the line A-A.

Figure 2:
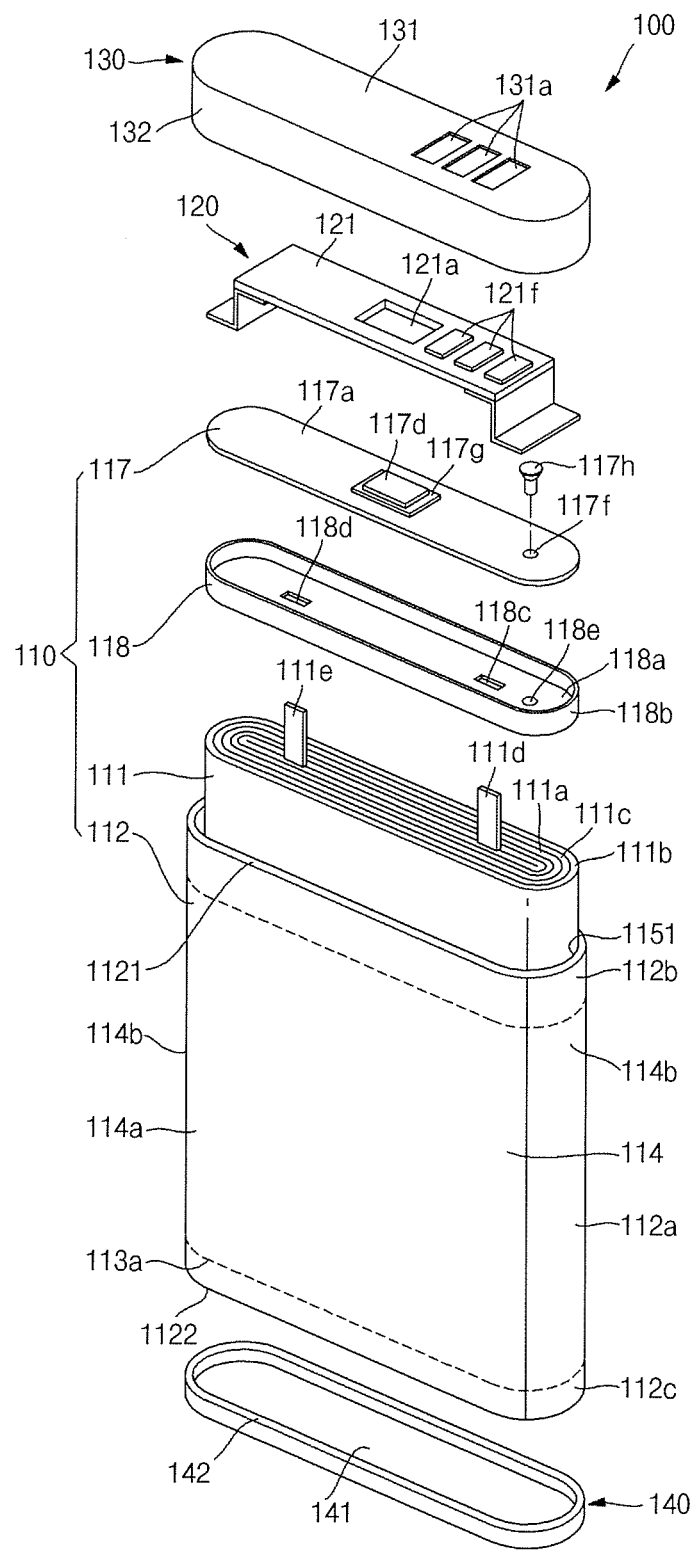
FIG. 2 is an exploded perspective view illustrating the secondary battery of FIG. 1.
Figure 3:
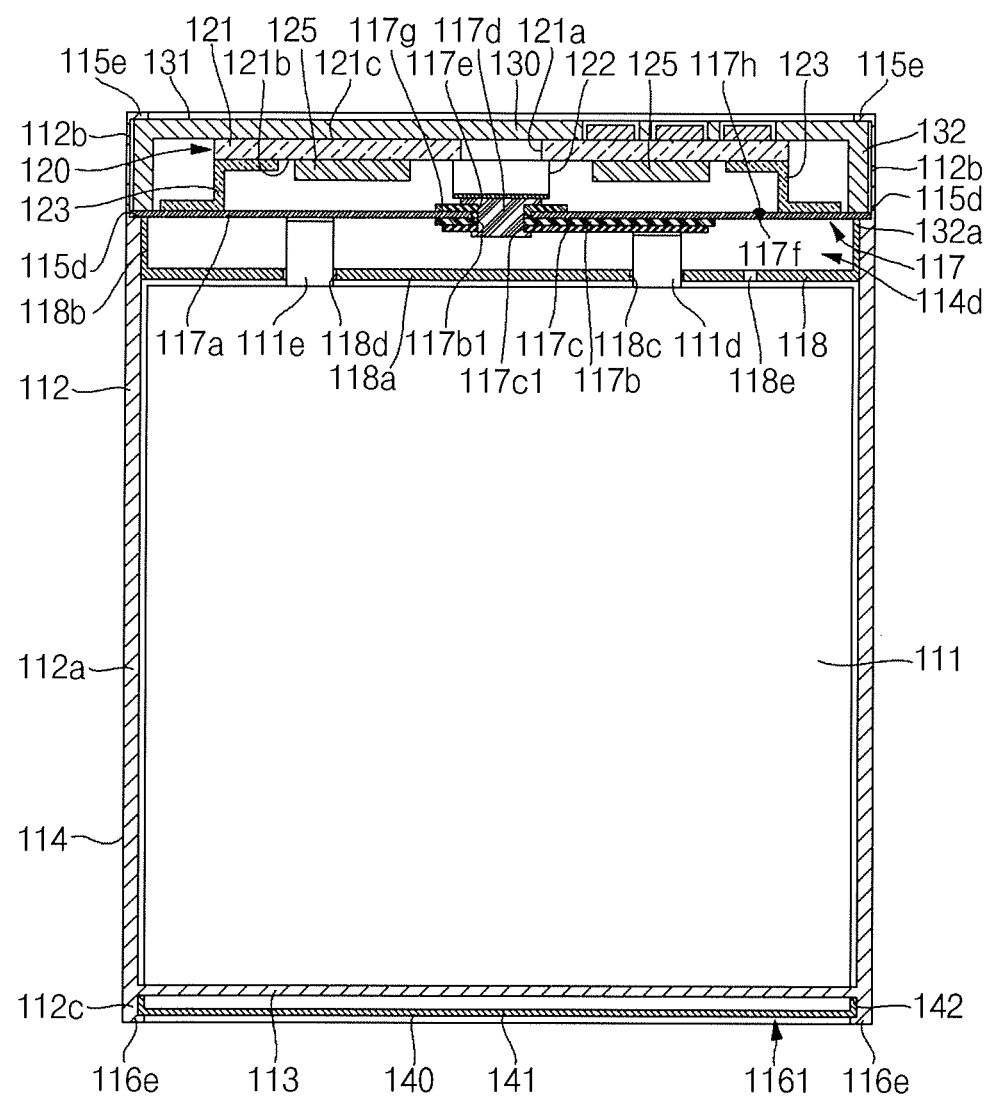
FIG. 3 is a sectional view of the secondary battery of FIG. 1, taken along the line A-A.

Referring to FIGS. 1 to 3, a secondary battery 100 according to one embodiment includes a bare cell 110, a protection circuit module (PCM) 120, a top case 130, and a bottom case 140. In the secondary battery 100, the bare cell 110 is stably charged and discharged using the PCM 120.

The bare cell 110 includes an electrode assembly 111, a can 112, a cap assembly 117, and an insulating case 118. The bare cell 110 stores electric energy supplied from a charger (not shown) and supplies the stored electric energy to an external load (not shown).

The electrode assembly 111 is configured, in one embodiment, by winding a first electrode plate 111a, a second electrode plate 111b, and a separator 111c disposed between the electrode plates 111a and 111b into a jelly-roll type of configuration. A first conductive electrode tab 111d is coupled with the first electrode plate 111a and protrudes over the top side of the electrode assembly 111. A second conductive electrode tab 111e is coupled with the second electrode plate 111b and protrudes over the top side of the electrode assembly 111. In one embodiment of the present invention, the first electrode plate 111a serves as a negative electrode plate and the second electrode plate 111b serves as a positive electrode plate. Thus, the first electrode tab 111d serves as a negative electrode tab and the second electrode tab 111e serves as a positive electrode tab. However, the present invention is not limited thereto. Alternatively, the first electrode plate 111a may serve as a positive electrode plate and the second electrode plate 111b may serve as a negative electrode plate so that the first electrode tab 111d may serve as a positive electrode tab and the second electrode tab 111e may serve as a negative electrode tab.

The can 112, in one embodiment, includes a body 112a, a first extension wall 112b, and a second extension wall 112c. The can 112 provides a space accommodating the bare cell 110, the PCM 120, the top case 130, and the bottom case 140.

The body 112a, in one embodiment, includes a relatively thin bar-shaped bottom plate 113 and a side wall 114 substantially perpendicular to the bottom plate 113 and connected to an edge 113a of the bottom plate 113. The body 112a provides a space for accommodating the electrode assembly 111 and the insulating case 118. That is, the side wall 114 of the body 112a, along with the bottom plate 113, defines a first cavity in which the electrode assembly 111 and the insulating case 118 are contained. The side wall 114 includes two wide side walls 114a facing each other and two narrow side walls 114b facing each other. The end of the side wall 114 is open to form a first opening 114d as an entrance through which the electrode assembly 111 and the insulating case 118 are inserted into the can 112. The first opening 114d is sealed by the cap assembly 117.

The first extension wall 112b extends from the end of the side wall 114 of the body 112a in a direction in which the first extension wall 112b extends away from the bottom plate 113. The first extension wall 112b provides a space in which the PCM 120 and the top case 130 are accommodated. That is, the first extension wall 112b defines a second cavity containing the PCM 120 and the top case 130. An end 1121 of the first extension wall 112b is open to form a second opening 1151 serving as an entrance through which the PCM 120 and the top case 130 are inserted. The end 1121 of the first extension wall 112b, in one embodiment, is bent inward to a first crimping portion 115e, and the top case 130 is held in the can 112 by the first crimping portion 115e. In the can 112, a step 115d is formed at a position where the first extension wall 112b and the side wall 114 of the body 112a are connected to each other. The cap assembly 117, in one embodiment, is placed on the step 115d so that welding between the can 112 and the cap assembly 117 may be easily carried out. The step 115d, in one embodiment, is formed due to a thickness difference between the first extension wall 112b and the side wall 114 of the body 112a.

A second extension wall 112c, in one embodiment, extends from an edge 113a of the bottom plate 113 in a direction opposite to the direction in which the first extension wall 112b extends. The second extension wall 112c provides a space for accommodating the bottom case 140. That is, the second extension wall 112c, along with the bottom plate 113, defines a third cavity in which the bottom case 140 is contained. An end 1122 of the second extension wall 112c is open to form a third opening 1161 serving as an entrance through which the bottom case 140 is inserted. The end 1122 of the second extension wall 112c, in one embodiment, is bent inward to a second crimping portion 116e. The bottom case 140 is held inside the third opening 1161 of the can 112 by the second crimping portion 116e. Although not depicted in the drawings, in an alternative embodiment, the secondary battery 100 does not include the bottom case 140, and the can 112 does not include the second extension wall 112c. That is, in another embodiment, the can 112 may include only the body 112a and the first extension wall 112b.

The can 112, in one embodiment, is made of metal, such as aluminum or an aluminum alloy which is light and flexible. However, the can 112 is not limited to the above materials and, in other embodiments, may be made of any other suitable metal or other suitable material.

The cap assembly 117 includes a cap plate 117a, an insulating plate 117b, a terminal plate 117c, and an electrode terminal 117d. The cap assembly 117 seals the first opening 114d of the can 112 and provides two terminals of the bare cell 110.

With reference to FIGS. 2 and 3, the cap plate 117a, in one embodiment, includes a terminal through-hole 117e and an electrolyte injection hole 117f and is made of a metal plate having a size and a shape corresponding to those of the second opening 1151 of the can 112. The cap plate 117a, in one embodiment, is placed on the step 115d of the can 112 and is coupled to the can 112 (e.g., by laser welding) to seal the first opening 114d. The second electrode tab 111e of the electrode assembly 111, in one embodiment, is coupled to the cap plate 117a (e.g., by laser welding) so that the cap plate 117a serves as a second terminal of the bare cell 110.

The terminal through-hole 117e, in one embodiment, is positioned in the center or near the center of the cap plate 117a and provides a path through which the electrode terminal 117d passes.

The electrolyte injection hole 117f is positioned at a location to a side of the terminal through-hole 117e. The electrolyte injection hole 117f provides a path through which an electrolyte is injected into the body 112a of the can and is sealed by a stopper 117h after the injection of the electrolyte.

The insulating plate 117b, in one embodiment, has a first path hole 117b1 formed at a side thereof. The electrode terminal 117d passes through the first path hole 117b1. The insulating plate 117b contacts an inner surface (i.e. a surface facing the electrode assembly 111) of the cap plate 117a and electrically insulates the terminal plate 117c from the cap plate 117a.

The terminal plate 117c contacts the insulating plate 117b and is electrically insulated from the cap plate 117a by the insulating plate 117b. That is, since the insulating plate 117b is positioned between the terminal plate 117c and the cap plate 117a, the terminal plate 117c is insulated from the cap plate 117a. The first electrode tab 111d of the electrode assembly 111, in one embodiment, is coupled to the terminal plate 117c, such as by laser welding. The terminal plate 117c, in one embodiment, has a second path hole 117c1 formed at a side thereof and at a location corresponding to the first path hole 117b1 of the insulating plate 117b. The electrode terminal 117d passes through the second path hole 117c1. According to one embodiment, the terminal plate 117c is made of nickel but the present invention is not limited thereto, and in other embodiments, the terminal plate 117c may be made of any other suitable material.

The electrode terminal 117d is inserted into the terminal through-hole 117e of the cap plate 117a to be coupled with the terminal plate 117c. The electrode terminal 117d, in one embodiment, is electrically connected to the first electrode tab 111d and is electrically insulated from the cap plate 117a by an insulating gasket 117g so that the electrode terminal 117d serves as a first terminal of the bare cell 110.

The insulating case 118, in one embodiment, includes a body 118a and a support 118b extending upward from an edge of the body 118a. The insulating case 118 is positioned between the electrode assembly 111 and the cap plate 117a within the body 112a of the can 112. The insulating case 118 electrically insulates the electrode assembly 111 from the cap plate 117a and restricts movement of the electrode assembly 111 within the can 112.

The body 118a, in one embodiment, is made of a plate having approximately the same shape as that of the first opening 114d and has a first electrode tab withdrawing hole 118c, a second electrode tab withdrawing hole 118d, and an electrolyte introduction hole 118e. The body 118a faces the electrode assembly 111 and electrically insulates the electrode assembly 111 from the cap plate 117a. The first electrode tab withdrawing hole 118c provides a path through which the first electrode tab 111d of the electrode assembly 111 passes. The second electrode tab withdrawing hole 118d provides a path through which the second electrode tab 111e passes. The electrolyte introduction hole 118e provides an opening through which the electrolyte is introduced into the can 112 toward the electrode assembly 111.

The support 118b, in one embodiment, contacts the side wall 114 of the body 112a of the can 112 and supports the body 118a of the insulating case 118 such that movement of the electrode assembly 111 within the can 112 is restricted.

The PCM 120, in one embodiment, includes a circuit board 121 and protection circuit devices 125 mounted on the circuit board 121. The PCM 120 is coupled with the bare cell 110 and is configured to control operation of the secondary battery 100 including charge and discharge thereof. The PCM 120 is accommodated within the first extension wall 112b of the can 112.

The circuit board 121 is a printed circuit board on which wiring patterns are printed and, in one embodiment, has a bar shape or approximate bar shape elongated in one direction. The circuit board 121 is spaced apart from the cap plate 117a of the bare cell 110. The circuit board 121 includes a first surface 121b facing the cap plate 117a and a second surface 121c opposite to the first surface 121b.

On the first surface 121b of the circuit board 121, a first electrode lead plate 122 and two second electrode lead plates 123 are mounted. The first electrode lead plate 122, in one embodiment, is positioned near the center of the circuit board 121 and is coupled to the electrode terminal 117d of the bare cell 110 by welding. The circuit board 121, in one embodiment, has a through-hole 121a formed at a location corresponding to a position where the first electrode lead plate 122 is mounted. The through-hole 121a provides a space necessary to weld the first electrode lead plate 122 to the electrode terminal 117d for coupling therebetween. The two second electrode lead plates 123, in one embodiment, are positioned at opposite ends in a longitudinal direction of the circuit board 121 and are coupled to the cap plate 117a of the bare cell 110 by welding.

On the second surface 121c of the circuit board 121, an external terminal 121f is provided to be electrically connected to an external load (not shown) or a charger (not shown).

The electric circuit devices 125 include devices such as a control IC, a charge and discharge switch, and/or any other desired circuit devices. The electric circuit devices 125 control the charge and discharge of the secondary battery 100. The electric circuit devices 125, in one embodiment, are mounted on the first surface 121b of the circuit board 121 by soldering.

The top case 130, in one embodiment, includes a cover plate 131 and a side wall 132 extending from the cover plate 131. The top case 130 accommodates the PCM 120 therein to protect the PCM 120. The top case 130 is accommodated in the space between the first extension wall 112b of the can 112 and the cap plate 117a, that is, the second cavity.

The cover plate 131, in one embodiment, has a shape corresponding to that of the second opening 115l. The cover plate 131 covers the circuit board 121 of the PCM 120 and protects the circuit board 121. The cover plate 131 has a terminal hole 131a through which the external terminal 121f of the PCM 120 is exposed to the outside. On the edge of the cover plate 131, the first crimping portion 115e of the can 112 is formed so that the top case 130 is held in the second cavity.

The side wall 132 extends from the edge of the cover plate 131 toward the cap plate 117a. An end of the side wall 132 contacts the cap plate 117a and supports the cover plate 131.

The bottom case 140, in one embodiment, includes a bottom plate 141 and a side wall 142 extending from the bottom plate 141. The bottom case 140 protects the bottom of the secondary battery 100. The bottom case 140 is accommodated in an inner space defined by the bottom plate 113 and the second extension wall 112c of the can 112, that is, the third cavity.

The bottom plate 141, in one embodiment, faces and is spaced apart from the bottom plate 113 by a distance. On an edge of the bottom plate 141, the second crimping portion 116e of the can 112 is formed so that the bottom case 140 is held in the third cavity.

The side wall 142 extends from the edge of the bottom plate 141 toward the bottom plate 113 of the can 112. An end of the side wall 142 contacts the bottom plate 113 of the can 112 and supports the bottom plate 141.

The bottom case 140 is accommodated within the second extension wall 112c of the can 112 such that the end of the side wall 142 contacts the bottom plate 113 of the can 112. The bottom case 140, in one embodiment, is stably fixed to the can 112 by the second crimping portion 116e formed on the second extension wall 112c.

Next, a secondary battery according to another embodiment of the present invention will be described with reference to FIG. 4.

Figure 4:
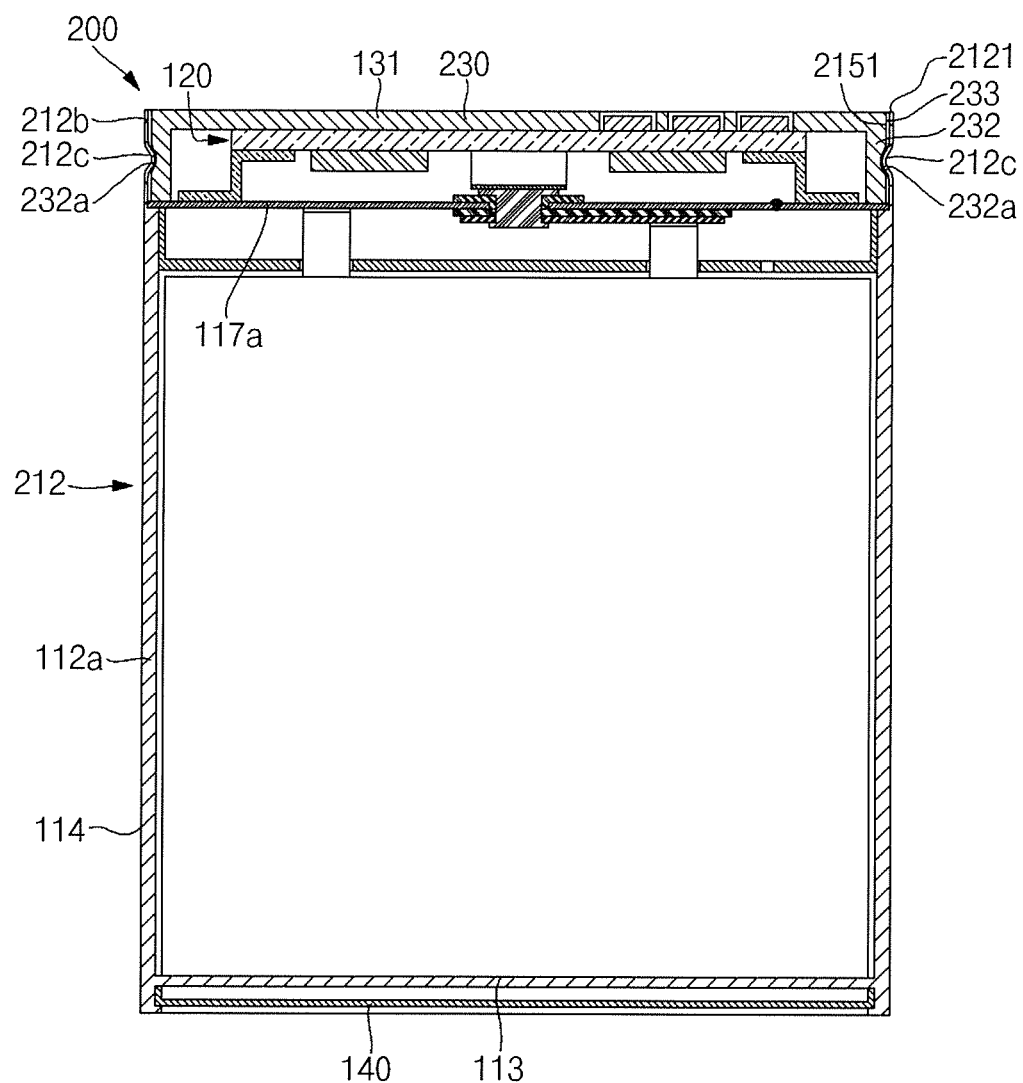
FIG. 4 is a sectional view illustrating a secondary battery according to another embodiment of the present invention.

FIG. 4 shows a sectional view of a secondary battery according to another embodiment of the present invention. In another embodiment of the present invention, the same reference numerals are assigned to the same elements as those in the previous embodiment of the present invention. Moreover, the same reference numerals are used throughout the drawings to refer to the same or like elements as those of the previous embodiment, and descriptions thereof will be omitted.

Referring to FIG. 4, a secondary battery 200 according to another embodiment of the present invention includes a can 212 and a top case 230. In the secondary battery 200, since elements excluding the can 212 and the top case 230 are identical to those of the secondary battery 100 according to the previously described embodiment of the present invention, the description of those elements will be omitted.

The can 212 includes a first extension wall 212b. In the can 212, since elements excluding the first extension wall 212b are identical to those of the previous embodiment, descriptions thereof will be omitted. The first extension wall 212b extends from an end of a side wall 114 of a body 112a of the can 212 in a same direction in which the side wall 114 extends away from a bottom plate 113. The first extension wall 212b provides a space into which a PCM 120 and the top case 230 are accommodated. That is, the first extension wall 212b defines a cavity containing the PCM 120 and the top case 230. An end 2121 of the first extension wall 212a is open to form a second opening 2151 as an entrance through which the PCM 120 and the top case 230 are inserted into the can 212. The first extension wall 212b, in one embodiment, has a protrusion 212c protruding inward therefrom, such as a protrusion formed by pressing the first extension wall 212b inward from the outside.

The top case 230 includes a side wall 232. In the top case 230, since elements excluding the side wall 232 are identical to those of the previously described embodiment, description thereof will be omitted. The side wall 232 extends from an edge of a cover plate 131 of the top case 230 toward a cap plate 117a. In one embodiment, a coupling groove 232a into which the protrusion 212c is inserted is formed on an outer surface 233 of the side wall 232. The protrusion 212c is inserted into the coupling groove 232a so that the top case 230 is stably fixed to the can 212. When the top case 230 is inserted into the cavity defined by the first extension wall 212b of the can 212, the top case 230 and the first extension wall 212b of the can 212 are elastically deformed and the protrusion 212c is inserted into the coupling groove 232a.

Next, a secondary battery according to another embodiment of the present invention will be described with reference to FIG. 5.

FIG. 5 shows a sectional view of a secondary battery according to another embodiment of the present invention. In another embodiment of the present invention, the same reference numerals are assigned to the same elements as those in the previously described embodiments of the present invention. Moreover, the same reference numerals are used throughout the drawings to refer to the same or like elements as those of the previously described embodiments, and descriptions thereof will be omitted.

Referring to FIG. 5, a secondary battery 300 according to another embodiment of the present invention includes a can 312. In the secondary battery 300, since elements excluding the can 312 are identical to those of the secondary battery 100 according to the previously described embodiment of the present invention, a description of those elements will be omitted.

The can 312 includes a first extension wall 312b and a second extension wall 312c. In the can 312, since elements excluding the first extension wall 312b and the second extension wall 312c are identical to those of the secondary battery 100 according to the previously described embodiment of the present invention, a description of those elements will be omitted.

The first extension wall 312b extends from an end of a side wall 114 of a body 112a of the can 312 in a same direction in which the side wall 114 extends away from a bottom plate 113. The first extension wall 312b provides a space into which a PCM 120 and a top case 130 are accommodated. That is, the first extension wall 312b defines a cavity containing the PCM 120 and the top case 130. An end 3121 of the first extension wall 312b is open to form a second opening 1151 as an entrance through which the PCM 120 and the top case 130 are inserted into the can 312. The top case 130 is inserted into the first extension wall 312b by press-fitting. The side wall 132 of the top case 130 securely contacts the first extension wall 312b of the can 312 so that the top case 130 is fixed to the can 312.

The second extension wall 312c extends from an edge of the bottom plate 113 of the body 112a in a direction opposite to the direction in which the side wall 114 extends. The second extension wall 312c provides a space into which the bottom case 140 is accommodated. That is, the second extension wall, together with the bottom plate 113, defines a cavity containing the bottom case 140. An end 3122 of the second extension wall 312c is open to form a third opening 3161 as an entrance into which the bottom case 140 is inserted. The bottom case 140 is inserted into the second extension wall 312c by press-fitting. A side wall 142 of the bottom case 140 securely contacts the second extension wall 312c of the can 312 so that the bottom case 140 is fixed to the can 312.

Although some exemplary embodiments of the present invention have been shown and described herein, it would be appreciated by those skilled in the art that changes may be made from these embodiments without departing from the principles and spirit of the invention, the scope of which is defined in the claims and their equivalents.

What is claimed is:

1. A secondary battery comprising:
an electrode assembly;
a can containing the electrode assembly and comprising:
a plate;
a wall extending from the plate in a first direction to a first end and defining a first cavity having a first opening at the first end opposite the plate; and
a first extension wall extending from the wall from the first end in the first direction to a second end, the first extension wall defining a second cavity having a second opening at the second end opposite the plate, the first opening being between the plate and the second opening in the first direction;

a cap assembly comprising a cap plate and sealing the first cavity at the first opening; and a first cover case in the second cavity between the cap assembly and the second opening, wherein the first extension wall has a thickness less than a thickness of the wall such that a step is formed at the first end of the wall, and the cap plate is welded to the can on the step, and wherein the first cover case contacts the can between the step and the second end.

2. The secondary battery of claim 1, wherein the plate and the wall integrally formed.

3. The secondary battery of claim 1, wherein the wall and the first extension wall are integrally formed.

4. The secondary battery of claim 1, wherein the cap plate is attached to the can in the second cavity and electrically coupled to an electrode tab of the electrode assembly.

5. The secondary battery of claim 1, further comprising an insulating case in the first cavity, the insulating case located between the electrode assembly and the cap plate for electrically insulating the electrode assembly from the cap plate.

6. The secondary battery of claim 1, further comprising a protection circuit module in the second cavity, the protection circuit module supported by the cap plate and adapted to control charging and discharging of the secondary battery.

7. The secondary battery of claim 6, wherein the first cover case in the second cavity is between the protection circuit module and the second opening.

8. The secondary battery of claim 1, wherein the can further comprises a first crimping portion proximate the second end, the first crimping portion fixing the first cover case to the can.

9. The secondary battery of claim 8, wherein the first extension wall and the first crimping portion are integrally formed.

10. The secondary battery of claim 1, wherein the first extension wall comprises a protrusion protruding inward, and the first cover case has a groove on an outer surface thereof, the groove receiving the protrusion and coupling the first cover case to the can.

11. The secondary battery of claim 1, wherein the first cover case is press-fit into the can at the second end.

12. The secondary battery of claim 1, wherein the cap plate has a perimeter size and shape substantially corresponding to a size and shape of the second opening.

13. The secondary battery of claim 1, wherein the can further comprises a second extension wall extending from the plate in a second direction opposite the first direction to a third end, the second extension wall defining a third cavity having a third opening.

14. The secondary battery of claim 13, further comprising a second cover case in the third cavity between the plate and the third opening.

15. The secondary battery of claim 14, wherein the can further comprises a second crimping portion proximate the third end, the second crimping portion fixing the second cover case to the can.

16. The secondary battery of claim 15, wherein the second extension wall and the second crimping portion are integrally formed.

17. A secondary battery comprising:
an electrode assembly;
a can containing the electrode assembly and comprising:
  a plate;
  a wall extending from the plate in a first direction to a first end and defining a first cavity having a first opening at the first end opposite the plate;
  an extension wall extending from the wall from the first end in the first direction to a second end, the extension wall defining a second cavity having a second opening at the second end opposite the plate, the first opening being between the plate and the second opening in the first direction; and
  a step formed by a thickness difference between the wall and the extension wall, wherein the step is formed at a position where the wall and the extension wall are connected to each other;
a cap assembly comprising a cap plate and sealing the first cavity at the first opening, the cap assembly being placed on the step;
an insulating case in the first cavity, the insulating case located between the electrode assembly and the cap plate for electrically insulating the electrode assembly from the cap plate;
a protection circuit module in the second cavity, the protection circuit module supported by the cap plate and adapted to control charging and discharging of the secondary battery; and
a cover case in the second cavity between the protection circuit module and the second opening.

* * * * *

UNITED STATES PATENT AND TRADEMARK OFFICE
CERTIFICATE OF CORRECTION

| | | |
|---|---|---|
| PATENT NO. | : 8,673,482 B2 | Page 1 of 1 |
| APPLICATION NO. | : 12/704401 | |
| DATED | : March 18, 2014 | |
| INVENTOR(S) | : Kwangsoo Yeo | |

It is certified that error appears in the above-identified patent and that said Letters Patent is hereby corrected as shown below:

In the Claims

Column 9, Claim 2, line 12    After "wall"

Insert -- are --

Signed and Sealed this
Ninth Day of February, 2016

Michelle K. Lee
*Director of the United States Patent and Trademark Office*